United States Patent [19]

Groteke

[11] 4,395,333
[45] Jul. 26, 1983

[54] PRE-WET AND REINFORCED MOLTEN METAL FILTER

[76] Inventor: Daniel E. Groteke, 1228 Ridge Cliff Rd., Cincinnati, Ohio 45215

[21] Appl. No.: 368,107

[22] Filed: Apr. 14, 1982

[51] Int. Cl.³ .................... B01D 39/14; B01D 37/02
[52] U.S. Cl. .................... 210/510; 210/773; 210/483; 210/500.1; 210/777; 156/89; 75/68 R; 428/408
[58] Field of Search ............ 210/773, 791, 774, 510, 210/446, 500.1, 503, 483, 777; 75/63, 67 A, 67 R, 68 R; 428/367, 408; 156/89

[56] References Cited

U.S. PATENT DOCUMENTS

| | | | |
|---|---|---|---|
| 3,243,313 | 3/1966 | Aves, Jr. | 428/408 |
| 3,300,298 | 1/1967 | Reding, Jr. | 75/67 |
| 3,462,289 | 8/1969 | Rohl et al. | 428/408 |
| 4,081,371 | 3/1978 | Yarwood et al. | 75/68 R |
| 4,124,506 | 11/1978 | Dore | 75/68 R |
| 4,126,560 | 11/1978 | Marcus et al. | 210/510 |
| 4,258,099 | 3/1981 | Narumiya | 210/773 |
| 4,265,059 | 5/1981 | Blome | 210/773 |
| 4,284,664 | 8/1981 | Rauch, Sr. | 428/408 |
| 4,298,187 | 11/1981 | Dantzig et al. | 75/68 R |

FOREIGN PATENT DOCUMENTS 599558  6/1960  Canada ................. 210/773

Primary Examiner—Charles N. Hart
Assistant Examiner—John W. Czaja
Attorney, Agent, or Firm—Janine J. Weins; Michael J. Weins

[57] ABSTRACT

The present invention relates to an improved filter element for use in an apparatus for filtering molten metal, and to the method of making such filter element. The apparatus consists of a filtering vessel fitted with a filter element. In one embodiment of the present invention the improved filter element is pre-wet with metal prior to the filtering apparatus being introduced into service. In a second embodiment of the present invention the improved filter element is reinforced with one or more reinforcing members. The improved filter element can be used in filtering vessels having a variety of designs.

13 Claims, 4 Drawing Figures

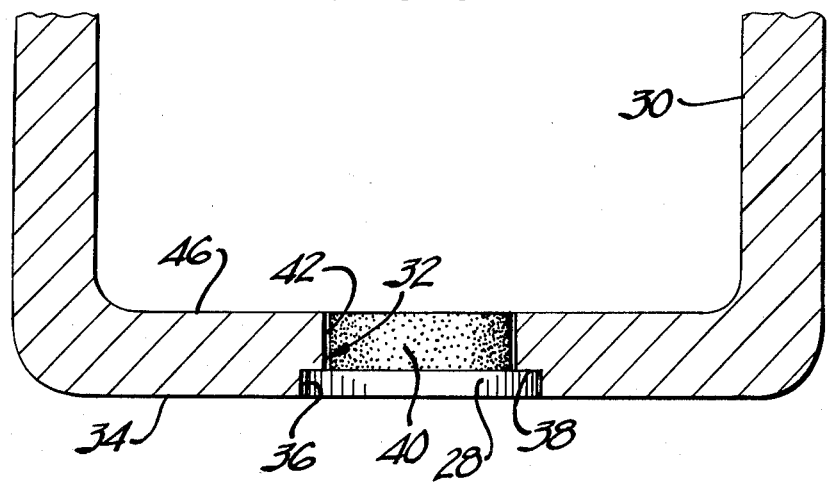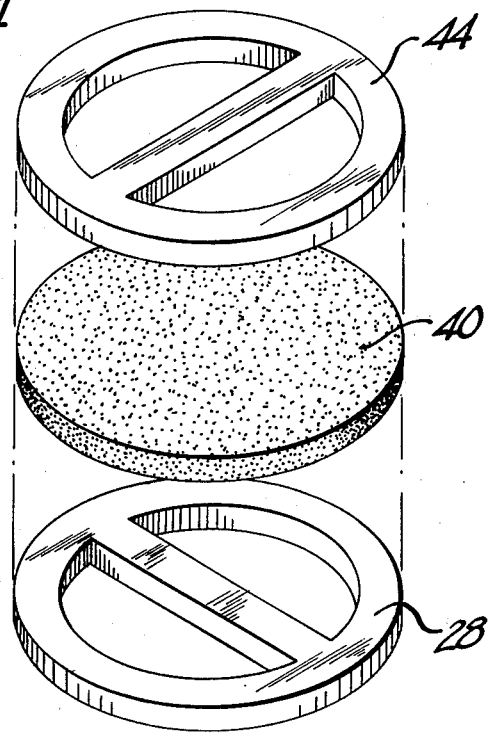

PRE-WET AND REINFORCED MOLTEN METAL FILTER

DESCRIPTION

1. Field of Invention

The present invention relates to a filter element for use in an apparatus for filtering molten metal.

2. Background Art

Molten metal, and in particular molten aluminum, frequently contains impurities which are detrimental to the resulting cast products. These impurities may be oxides of the metal, inclusions introduced by fluxes used during melting, inclusions present in scrap introduced into the melt, or products formed by interaction with the furnace lining.

Techniques for removing oxides and other impurities from molten metal are taught in U.S. application Ser. No. 256,829 filed Apr. 23, 1981, and in two co-pending applications of the inventor of the present application. These techniques teach filtering molten metal using a crucible or filtering vessel, a portion of which is a filter element made from porous filter material.

When the filter element is initially placed in a molten metal bath the molten metal must penetrate and heat the filter element. This initial penetration of the filter element is slow, and particularly slow when a fine pore filter element is used. Materials generally used for filtration of molten metal have relatively low thermal conductivity. This relatively low thermal conductivity can result in a significant temperature drop in the vicinity of the filter element. It is possible, if sufficient superheat is not used, to have localized solidification occur within the filter element. Localized solidification of the molten metal can slow the rate of liquid metal penetration of the filter element, and may set up local stresses which may damage the filter element.

When the filtering apparatus is inserted into, moved within, or removed from a bath of molten metal, the filter element is subjected to hydrostatic pressure. Since filter elements are frequently made from brittle materials, there is particular risk that a new filter element that has not been penetrated by metal will fracture under the hydrostatic pressure. In addition, because of the relatively low thermal conductivity of filter elements there is the risk that during initial penetration of a non-wet filter element into a bath of molten metal the filter element will be damaged by thermal shock.

SUMMARY OF INVENTION

The present invention provides an improved filter element to be used in an apparatus for filtering molten metal. The filter element is made from a porous ceramic body with interconnected pores throughout. The filter element has a central region which is bounded by a peripheral edge. A refractory cement which penetrates the pores in the vicinity of the peripheral edge is used to bond the filter element to a filtering vessel. In one embodiment of the present invention the filter element is pre-wet prior to the filter element being introduced into service. The pre-wetting is achieved by penetrating the pores in the central region of the filter element with a metal compatible with the metal to be filtered in service.

Pre-wetting increases the thermal conductivity of the filter element, and imparts rigidity to the filter element. When the filter element is pre-wet the start-up time is greatly reduced and the incidence of damage caused to the filter element by thermal shock and mechanical loading is also reduced. For fine pore filters, and especially filters with a pore density of more than 45 pores per inch the savings in start up time is most significant. It has not been found practical to use a very fine pore filter in which the pore density is greater than 60 pores per inch unless the filter is pre-wet prior to being introduced into service. When the size of the filter element is large, and particularly when the size of the filter element is in the order of 24 inchs across, the incidence of filter element failure due to thermal shock is significantly reduced by pre-wetting the filter element.

The present invention also relates to an improvement in the filter element construction. This improvement in construction is achieved by the attachment to, or incorporation of at least one reinforcing member. The reinforcing member adds rigidity to the filter element, and thereby minimizes the occurrences of filter element damage that may result from thermal shock, and mechanical loading when the filtering vessel is moved into, out of, or within a molten metal bath. The reinforcing member also makes the filter element more resistant to damage from low cycle fatigue that occurs during the cyclic removal of molten metal from the filtering vessel. As metal is removed from the filtering vessel a differential head between metal within, and metal exterior to the filtering vessel is established. This differential head causes a hydrostatic force to be cyclically applied to the filter element. The benefit obtained by the use of reinforcing members is most significant when either large filter elements are used, the filtering apparatus is frequently repositioned within the molten metal bath, and/or a large volume of metal relative to the capacity of the filtering vessel is frequently removed.

The improved filter element of the present invention can be used in a filtering vessel which is submerged in a bath of molten metal. The molten metal is filtered by passing through the filter element into the filtering vessel. Filtered metal can be removed from the filtering vessel by a ladle. The filtering vessel of this design can be separable from the furnace, or a furnace wall can form an integral part of the vessel. The filter element of the present invention can also be used in a molten metal filtering apparatus that interrupts the path of a molten metal stream. Unfiltered molten metal is collected in the filtering vessel and the molten metal is filtered by flowing from the filtering vessel.

The present invention also relates to an improved method for filtration of molten metal. Prior to introduction into service of a filtering vessel, the filter element is pre-wet. The pre-wetting is accomplished by filling the pore of the filter element with a lower melting temperature alloy than the metal the filter element is intended to filter in service. In addition to having a lower melting temperature the pre-wetting metal should be campatible with the molten metal to be filtered in service. The pre-wet filter element has higher thermal conductivity and greater rigidity than does a non-wet filter element. By pre-wetting the filter element the start-up time for a new filtering apparatus is reduced, and the filter element is less likely to be damaged as a result of thermal shock and mechanical loading.

The present invention also relates to an improved method of imparting rigidity to a filter element by attaching to, or incorporating in, the filter element one or more reinforcing members.

By both pre-wetting and reinforcing a filter element prior to introducing the filter element into service the incidence of filter element failure can be significantly reduced, and the start-up time for a new molten metal filtering apparatus can be reduced.

BRIEF DESCRIPTION OF THE DRAWINGS

FIG. 3 is a schematic representation of a filtering vessel containing a third embodiment of a reinforced filter element of the present invention.

FIG. 4 is a schematic representation of a section of a filter element showing a fourth embodiment of a reinforced filter element of the present invention.

BEST MODES OF CARRYING THE INVENTION INTO PRACTICE

Figure 1:
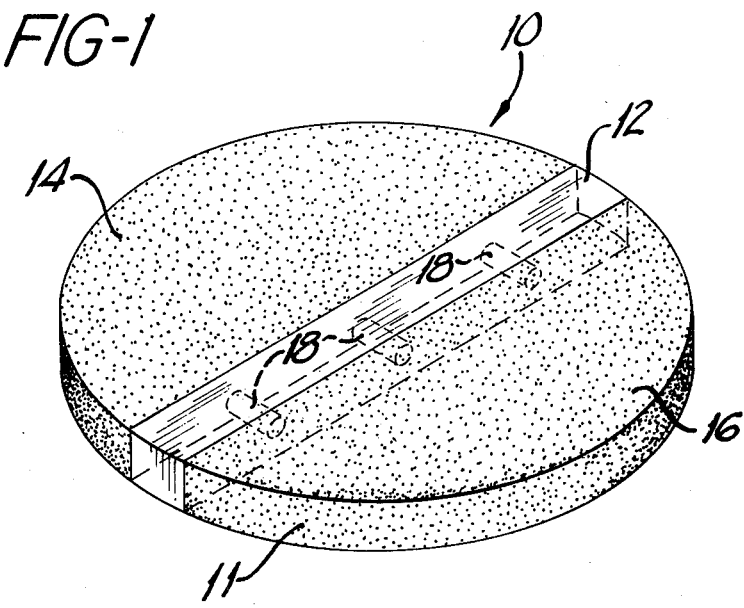
FIG. 1 is a schematic representation of a reinforced filter element of the present invention.

For one embodiment of the improved filter element of the present invention, the filter element, prior to the filter element being introduced into service, is pre-wet with a metal having a lower melting temperature than, and being compatible with, the metal to be filtered in service. When an aluminum alloy is to be filtered in service compatible pre-wetting alloys include low dross forming aluminum eutectic alloys such as, $Al_{66.8}Cu_{33.2}$; $Al_{87.4}Si_{12.6}$; and $Al_5Zn_{95}$. These alloys are well suited for pre-wetting the filter element since dross will not form and plug the filter as the alloys pass through the filter. Futhermore, these pre-wetting alloys do not form high melting temperature compounds when diluted by additions of those aluminum alloys usually filtered by the filter element of the present invention.

The filter element can be pre-wet either after the filter element is assembled and inserted in the filtering vessel, or prior to assembly and insertion. If the filter elements are pre-wet prior to being assembled and inserted in the filtering vessel, pre-wetting filter elements both to be used in new filtering apparatus, and for replacement parts, can be pre-wet by the same process.

When the filter elements are pre-wet separate from the filtering vessel it is recommended that the peripheral edge of the filter element be pre-washed with a refractory cement. The refractory cement as applied, preferably is more fluid than when the refractory cement is used to cement a non-pre-wet filter element in place. The added fluidity aides the refractory cement in penetrating the pores of the filter element in the vicinity of the peripheral edge. After pre-washing it is recommended that the peripheral edge of the filter element be masked or otherwise protected before the filter element is pre-wet. If the peripheral edge of the filter element is not masked or otherwise protected before pre-wetting, then after the pre-wetting operation and prior to inserting the filter element into the filtering vessel, it may be necessary to machine the peripheral edge of the filter element to remove pre-wetting metal, and thereby expose the cement in the pores of the pre-washed surface of the peripheral edge of the filter element.

Pre-wetting a filter element can be done in either a single step, or in multiple steps. A two step pre-wetting process may be necessary for fine pore filter those with more than 40 pores per inch. During the first step the filter is pre-wet with a low dross forming alloy having a lower melting temperature than the metal used in the susequent steps. If, for example the filter element is to be used to filter an aluminum alloy, a low melting eutectic alloy such as $Pb_{38.1}Sn_{61.9}$ can be used in the first pre-wetting step. In a second step a low dross forming metal having an intermediate melting temperature below that of the metal to be filtered in service, and higher than the metal used in the first pre-wetting step should be used. If the filter element is to be used to filter an aluminum alloy, the eutectic alloys set forth above for the single step pre-wetting process can be used for the second pre-wetting step. Any metals used to pre-wet the filter element should be compatible with the metal to be filtered in service, and with all other metals used for pre-wetting. Compatibility of the pre-wetting metal with the metal to be filtered in service is essential for the metal last used to pre-wet the filter element. The metal used to pre-wet the filter element should not react with the filter material, and it should not form tenacious oxides, nor high melting compounds with any liquid metals that might contact the filter element.

When dilution of the metal to be filtered in service by the pre-wetting metal is undesirable and therefore such dilution must be minimized, then the metal initially filtered in service can be removed and pigged for scrap.

The filter element can be pre-wet by submersion in a molten metal bath for a time sufficient to cause molten metal to fully penetrate the filter element. It is preferred during pre-wetting that the faces of the filter element be subjected to differential pressure. This differential pressure assists the flow of molten metal through the filter element and the time for the pre-wetting operation is reduced.

Pre-wetting filters with a fine pore size can greatly reduce the time necessary for initial penetration of the filter element by molten metal, and because of the increased thermal conductivity imparted to the filter element by pre-wetting the incidence of damage caused to the filter element by attempts to pre-heat the filter element are reduced by pre-wetting. Fine pore non-pre-wet filter elements require pre-heating using infra-red or open flame heaters prior to introduction into service. The pre-heating often causes the filter element to spall or otherwise be damaged. Even when pre-heated initial penetration of the filter element by molten metal is slow, and particularly slow when the filter element has fine pores.

It is further preferred, particularly if the filter element will be frequently and/or rapidly moved into, out of or within the molten metal bath, that the filter element be reinforced with one or more reinforcing members. A reinforcing member can be placed between adjacent filter segments as shown in FIG. 1, a reinforcing member can be sandwiched between parallel filter segments as shown in FIG. 2, or a reinforcing members can be places contiguous to one or both of the exterior faces of the filter element as shown in FIGS. 3 and 4.

The reinforcing member can be made from any material used to make the filtering vessel. It is preferred that the reinforcing member be made from the same material as is used in the construction of the filtering vessel so as to minimize differential thermal exposure. When using a reinforcing member it is preferred to use clay-graphite for both the filtering vessel and for the reinforcing member.

FIG. 1 shows a circular filter element 10 having a peripheral edge 11. The filter element 10 is reinforced by the use of a diagonal reinforcing member 12. The reinforcing member 12 is bonded to filter segment 14, and filter segment 16 by a refractory cement. Preferably the reinforcing member 12 is constructed of a rigid, resilient material such as clay-graphite. Prior to assembly, cavities, such as the passages 18 shown in FIG. 1, can be made in the reinforcing member 12. The cavities act as reservoirs for holding cement. After the filter segments 14, and 16 have been placed in contact with the reinforcing member 12 cement can flow from the passages 18 into the pore of the filter material and in this manner effect a strong bond between filter segments 14 and 16, and between the reinforcing member 12. If the passages 18 are continuous through the reinforcing member 12 then the filter segments 14, and 16 will be bonded to each other, as will as to the reinforcing member 12.

Figure 2:
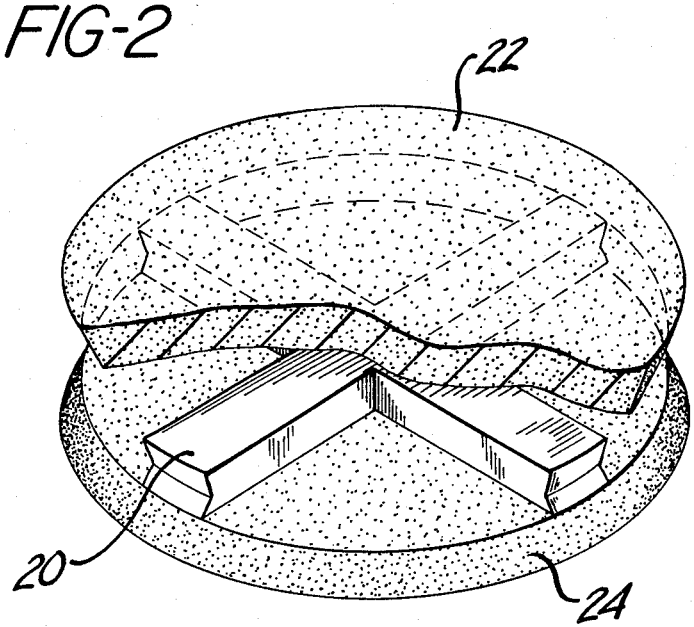
FIG. 2 is a schematic representation of a second embodiment of a reinforced filter element of the present invention.

An alternate construction of a reinforced filter element is shown in FIG. 2. In this construction a reinforcing member 20 is sandwiched between filter segment 22 and filter segment 24. The reinforcing member 20 may be cemented to the filter segments 22 and 24 by a refractory cement, however the reinforcing member 20 need not be cemented to the filter segments 22 and 24. This construction is recommended when the peripheral edge of the filter element has the concave configuration 26 shown in FIG. 2. This concave circumferential configuration 26 is preferred when the filter element will be subjected to large mechanical stresses during operation.

The sandwich filter element configuration shown in FIG. 2 is also recommended when it is desired to use a filter element having multiple pore size sections. When the filtering vessel is submerged in a bath of molten metal the lower filter segment 24 should have larger pores for filtering out the larger inclusions, while the upper section 22 should have finer pores. However, if the molten metal filtering apparatus is to be use to interrupt the path of a molten metal stream the upper filter segment 22 should be a coarser pore filter, while the lower filter segment 24 should be the finer pore filter. If the size of inclusions in the molten metal vary widely a filter element with two different pore size filter segments will have a longer life than will a filter element with a uniform pore size.

The filter element of the present invention can be reinforced by the use of a reinforcing member exterior to and parallel to the filter element surface. FIG. 3 shows one preferred configuration for an exterior reinforcing member 28. The filtering vessel 30 has a hole 32 which passes through the bottom 34 of the vessel 30. The walls of the hole 32 have a lip 36. The reinforcing member 28 is attached to the underside 38 of the lip 36 by refractory cement. The filter element 40 is then attached to the wall of the hole in the bottom of the filtering vessel 42 by refractory cement. Optionally the filter element 40 may be attached to the reinforcing member 28 by the use of refractory cement.

If additional resistance to mechanical stress is desired an optional cap 44, as shown in FIG. 4, can be placed over the filter element 40. The cap 44 is attached to the inside bottom 46 of the filtering vessel 30 by use of refractory cement, and may optionally be attached to the filter element 40 by a refractory cement.

When either a faceted or a circular filtering vessel is used it is preferred that the filter element have a circular outline, since a filter element with a circular outline does not have corners which can act as stress risers and thereby be sites for the initiation of cracks. The circular filter element used in a faceted vessel can be reinforced in any of the above described manners.

The method of the present invention involves pre-wetting the filter element prior to the filter element being introduced into service. Pre-wetting the filter element increases the rigidity and thermal conductivity of the filter element.

The method of the present invention is to pre-wet, or reinforce the filter element prior to introduction of the filter element into service, or to both pre-wet and reinforce the filter element prior to introduction into service. Reinforcing the filter element imparts rigidity to the filter element, and thereby allows the filter element to better withstand the hydrostatic pressure applied to the filter element when it is moved into, out of, or within a bath of molten metal, and to withstand the mechanical loading that is applied to the filter by the weight of the metal contained within the filtering vessel after the filtering apparatus is withdrawn from a bath of molten metal. Additionally, reinforcing the filter element reduces the incidence of failure due to low cycle fatigue of a filter element used in a filtering vessel submerged in a bath of molten metal. The low cycle fatigue is caused by the periodic removal of molten metal from the filtering vessel and the subsequent hydrostatic pressure applied to the filter element by the resulting differential head of metal established between the level of molten metal exterior to and the level of molten metal interior to filtering vessel.

To better understand the carrying of the invention into practice the following examples are offered.

EXAMPLE I

A filter having 24 pores per cm (60 pores per linear inch), was to be used to filter molten ASTM 357.0 (Si 6.5-7.5%, Fe 0.150 max., Cu 0.05%, Mn 0.03% max, Mg 0.45-0.60%, Zn 0.050 max, Ti 0.20% max, Al bal.). ASTM 357 has a melting point of 604° C. (1120° F.). The filter element was pre-wet in two steps. For the first step a Zinc-5% Aluminum alloy was used. This alloy has a melting point of 382° C. (720° F.) and during the pre-wetting operation the molten Zinc-5% Aluminum alloys was maintained at 537° C. (1000° F.). The initial pre-wetting was conducted by placing the filter element in a suitable vessel using a pre-wetting fixture. A differential hydrostatic pressure of was maintained by adjusting the differential head height to a maximum of 5.1 cm (2 inches) while the filter was being pre-wet. For the first pre-wetting it took less than ten minutes for the Zinc-5% Aluminum alloy to penetrate the filter element.

For the second pre-wetting step alloy ASTM 413.0 (Si 11-13%, Fe 2.0% max, Cu 1.0% max, Mn 0.35% max, Mg 0.10% max, Ni 0.5% max, Zn 0.5% max, Sn 0.15% max, Al bal.) was used. This aluminum alloy has a melting point of 585° C. (1085° F.) and during pre-wetting the bath of molten 413.0 alloy was maintained at 760° C. (1400° C.). This second pre-wetting step was carried out using a differential hydrostatic pressure obtained by maintaining a 7.6 cm (3 inch) differential head height. The second pre-wetting was carried out immediately following the initial pre-wetting and therefore the filter element was pre-heated during the initial pre-wetting step. It took less than two minutes for the metal used in the second pre-wetting step to fully penetrate the filter element.

The filter element pre-wet as described above was used to filter ASTM 357 which was contained in a reverberatory furnace maintained at 760° C. (1400° F.). The time required for the metal to fill the filtering vessel containing the pre-wet filter element was 10 minutes. This represented a reduction in 35 minutes when compared to the time of 45 minutes which was necessary to fill a filtering vessel of the same volume fitted with a non-pre-wet filter element.

EXAMPLE II

A filter having an average pore size of 17.7 pores per cm (45 pores per inch) was to be used to filter ASTM 319.0 (Si 5.5–6.5%, Fe 1.0% max, Cu 3.0–4.0%, Mn 0.5% max, Mg 0.1% max, Ni 0.35% max, Zn 1.0% max, Ti 0.25% max, Al bal.). The melting temperature of ASTM 319 is 604° C. (1120° F.). The filter was pre-wet in a single step. For the pre-wetting a Zinc-5% Aluminum alloy which has a melting temperature of 382° C. (720° F.) was used. During pre-wetting the filter was submerged in a molten bath of Zinc-5% Aluminum maintained at 537° C. (1000° F.). A differential hydrostatic pressure was maintained while the filter was being pre-wet by maintaining a differential head of 2.5 cm (1 inch). It took less than 5 minutes for the pre-wetting metal to completely penetrate the filter. The filter pre-wet in this manner was fitted to a filtering vessel. The filtering vessel fitted with the pre-wet filter element was submerged directly in a molten metal bath of ASTM 319.0 aluminum alloy without pre-heating. The molten 319.0 was maintained at 760° C. (1400° F.). It took less than 10 minutes for the molten 319 alloy to penetrate the filter element, when using a filtering vessel fitted with a filter element that had not been pre-wet it took 45 minutes for molten 319 aluminum alloy to penetrate the filter element.

EXAMPLE III

A filter element having 30 pores per inch was to be used to filter ASTM 319 in service. The filter element was pre-wet in a single step using ASTM 413.0. During the pre-wetting the molten 413.0 was maintained at 760° C. (1400° F.). The filter element was submerged so as to maintain a hydrostatic head of 3 inches. The filter element was completely penetrated by the pre-wetting metal in 10 to 15 minutes.

The filter element pre-wet as described above was used to filter ASTM 319.0 which was maintained in a reverberatory furnace at 760° C. (1400° F.). By pre-wetting the filter element prior to service the time for the ASTM 319.0 alloy to fill the filtering vessel was reduced to half of the previous time, being reduced from 20 minutes to 10 minutes.

EXAMPLE IV

A 10 inch in diameter round clay-graphite filtering vessel was fitted with a 7 inch in diameter filter element having 30 pores per inch. The filtering vessel was submerged in a bath ASTM 332 (Si 8.5–10.5%, Fe 1.2% max, Cu 2.0–4.0%, Mn 0.5% max, Mg 0.5–1.5%, Ni 0.5% max, Zn 1.0% max, Ti 0.25% max, Al bal.). The molten 332 alloy was maintained at 677° C. (1250° F.). In less than 3 hours the filter element ruptured leaving the peripheral edge of the filter element attached to the wall of the hole in the bottom of the filtering vessel. The filter element was found to have softened in the presence of the molten relatively high Si—Mg content aluminum alloy.

EXAMPLE V

The filtering vessel described in Example IV was reused to filter the same ASTM 332 alloy. The filter element was reinforced in the manner depicted in FIG. 1 with a diagonal reinforcing member made of clay-graphite. The filtering vessel fitted with the reinforced filter element was used to filter ASTM 332 maintained at 677° C. (1250° F.). Although the filter element segments softened in the presence of the high Si—Mg aluminum alloy the filtering vessel fitted with the reinforced filter element experienced more than 40 hours of service before failure. During the 40 hours of operation no noticeable deterioration of the filter element was detected.

While the novel features of this invention have been described in terms of preferred embodiments and particular applications, it will be appreciated that various omissions and substitutions in form and in detail of the apparatus and method may be made by those skilled in the art without departing from the spirit of the invention.

What I claim:

1. A filter element for insertion into a filtering vessel for filtering molten metal the filter element having reduced start-up time and reduced damage caused as a result of thermal shock, the filter element, comprising:
    a porous ceramic body with interconnected pores throughout, said body having a central region bounded by a peripheral edge region;
    a refractory cement filling said pores in said peripheral edge region; and
    a metal alloy filling the pores of said central region of said porous ceramic body to thereby reduce start-up time and damage to the filter element.

2. The filter element of claim 1 wherein said pore size is smaller than 17.7 pores per cm (45 pores per in).

3. The filter element of claim 2 wherein said metal alloy filling the pores of said central region is an aluminum eutectic alloy.

4. The filter element of claim 3 in which the aluminum eutectic alloy contains 95% zinc-5% aluminum.

5. The filter element of claim 3 in which the aluminum eutectic alloy is ASTM 413.0.

6. The filter element of claim 1 which has increased rigidity so as to extend the service life of the filter element when inserted into a filtering vessel for filtering molten metal, said filter element comprising:
    a porous ceramic body with interconnected pores throughout having a first section and a second section; and
    at least one reinforcing member interposed between said first section and said second section.

7. The filter element of claim 6 further comprising:
    means for attaching said first section to said reinforcing member, and said reinforcing member to said second section.

8. The filter element of claim 6 or 7 wherein said reinforcing member has passages therethrough which provide communication between said first section and said second section and means for attaching is a refractory cement.

9. A method for pre-wetting a filter element for filtering molten metal, the filter element having reduced start-up time and reduced damage caused as a result of thermal shock, the pre-wetting comprising the steps of:
    first pre-wetting the filter element with a first metal alloy having a melting point less than a second metal alloy; and
    thereafter pre-wetting the filter element with said second metal alloy, said second metal alloy being compatible with the molten metal to be filtered, which thereby reduces start-up time and damage to the filter element.

10. The method of claim 9 in which said first metal alloy is ASTM 357.0 and said second alloy is ASTM 413.0.

11. The method of claim 9 further comprising the step of:
   pre-washing the peripheral edge of the filter element with a refractory cement before said first pre-wetting step.

12. The method of claim 11 further comprising the step of:
   masking said pre-washed peripheral edge before said first pre-wetting step.

13. The method of claim 12 wherein the filter element has a pore size of less than 15.7 pores per cm (40 pores per inch), the filter element is used to filter aluminum, said refractory cement is selected from the group consisting of alumina and silica, the metal alloy for said first pre-wetting step is selected from a group of low melting temperature aluminum eutectic alloys, and said second pre-wetting step are selected from a group of eutectic aluminum alloys.

* * * * *